United States Patent [19]

Engst

[11] Patent Number: 4,809,845
[45] Date of Patent: Mar. 7, 1989

[54] HOSE BELT CONVEYER SYSTEM

[75] Inventor: Wilhelm Engst, Garbsen, Fed. Rep. of Germany

[73] Assignee: Continental Aktiengesellschaft, Hanover, Fed. Rep. of Germany

[21] Appl. No.: 74,364

[22] Filed: Jul. 16, 1987

[30] Foreign Application Priority Data

Jul. 17, 1986 [DE] Fed. Rep. of Germany ....... 3624122

[51] Int. Cl.⁴ .......................................... B65G 15/08
[52] U.S. Cl. .................................................. 198/819
[58] Field of Search ................................ 198/818-820

[56] References Cited

FOREIGN PATENT DOCUMENTS

| 0050962 | 5/1982 | European Pat. Off. ............ 198/819 |
| 3606129 | 8/1986 | Fed. Rep. of Germany ...... 198/819 |
| 0145708 | 9/1982 | Japan ................................. 198/819 |
| 0007127 | 1/1986 | Japan ................................. 198/819 |
| 2094741 | 9/1982 | United Kingdom ................ 198/819 |

Primary Examiner—Frank E. Werner
Assistant Examiner—Lyle Kimms
Attorney, Agent, or Firm—Becker & Becker, Inc.

[57] ABSTRACT

A hose belt conveyor system that is provided with support rollers that are divided into garlands of rollers. That roller which rolls along the belt to the side of the belt edge of the overlapping portion of the belt, is provided with an extension, the end of which is preferably rounded off. This extension brings about a considerable reduction of the wear of this belt edge.

10 Claims, 1 Drawing Sheet

HOSE BELT CONVEYER SYSTEM

BACKGROUND OF THE INVENTION

The present invention relates to a hose belt conveyor system having a conveyor belt that is made of rubber or rubber-like synthetic material, contains filamentary load-carriers which extend in the longitudinal direction of the belt, and that can be closed, by overlapping its longitudinal edge regions, to form a hose belt that is supported all the way around by support rollers, with these rollers being divided into garlands of rollers; in particular, in a given stretch of the conveyor system that has been closed in the manner of a hose, a first garland of rollers is provided that substantially surrounds the lower half of the cross section of the hose belt, and a second garland of rollers is provided that substantially surrounds the upper half of the cross section of the hose belt.

Systems of this general type are described in Canadian patent application Ser. No. 516,229-Engst, filed Aug. 19, 1986, and in U.S. patent application Ser. No. 833,903, filed Feb. 26, 1986, now U.S. Pat. No. 4,723,653-Engst dated Feb. 9, 1988 both of which belong to the assignee of the present application.

Hose belt conveyor systems are described, for example, in German Patent 943 817 Gielen dated June 1, 1956, German Offenlegungsschrift 1 934 342 Bouzat et al dated July 16, 1970, and German Patent 2 944 448 Hashimoto et al dated May 21, 1981. The drawback with the known systems of this type is that the support and guide rollers, which support the conveyor belt and guide it in hose form, are rigidly disposed around the cross section of the belt, and have a constant symmetrical distribution thereabout. As a result of this rigid arrangement of the rollers, a specific hose cross section, which is prescribed exactly by the position of the rollers, is constantly forced upon the conveyor belt, and this is true independent of the shape and distribution of the material that is being transported at any given time. With such a configuration, the material of the belt is greatly stressed, especially when bulky material is conveyed, which could damage the belt. The heretofore known hose belt conveyor systems also have the drawback that the assembly of the conveyor belt, as well as maintenance and repair, is very expensive, since the conveyor belt is very inaccessible due to the support frame that surrounds it, and on which the rollers are fixedly mounted.

To avoid these drawbacks, it was proposed in applicant's above mentioned applications, to divide the support rollers of a hose belt conveyor system into garlands of rollers. In particular, in a given stretch of the conveyor system that has been closed in the manner of a hose, a first garland of rollers was provided that essentially surrounds the upper half of the cross section of the hose belt, and a second garland of rollers was provided that essentially surrounds the lower half of the cross section of the hose belt. Preferably, a lower roller garland is associated with each of the upper roller garlands, with the upper and lower roller garlands being disposed either exactly across from one another, or being offset slightly relative to one another, when viewed in the longitudinal direction of the belt.

Pursuant to one advantageous embodiment, the aforementioned system took into account the fact that with the previously known hose belt conveying systems, due to their rigid arrangement of the support rollers, the longitudinal edge of that belt edge region which overlaps during formation of the hose frequently collides with the end face of the adjacent lateral support roller. Over time, this can result in damage to this longitudinal edge of the belt, which necessitates expensive repair or even replacement of the entire belt.

To resolve this problem, it was proposed that in the upper roller garlands, the distance between those two rollers that are disposed on both sides of the longitudinal edge of the overlapping belt edge region be greater than the distances between the remaining rollers. This prevents these longitudinal belt edges from striking the end faces of the laterally adjacent roller, and thus becoming damaged, when slight fluctuations or twists of the moving hose belt are encountered. This increased roller gap was realized in particular by placing between the two aforementioned rollers that are disposed on both sides of the longitudinal edge of the belt, a connecting link that is longer than the other connecting links of the remaining rollers of the upper garlands, with the rollers themselves all having the same dimensions.

However, experience has, in the meantime, shown that these measures are not always suitable or satisfactory to prevent the edge of the belt from contacting the end face of the adjacent lateral support roller under all operating conditions that occur in practice, especially where the system passes through a narrow curve, or where the load on the belt fluctuates greatly.

It is therefore an object of the present invention to provide an improved hose belt conveyor system where contact of the belt edge against the end face of the adjacent lateral support roller is reliably avoided under all operating conditions.

BRIEF DESCRIPTION OF THE DRAWINGS

This object, and other objects and advantages of the present invention, will appear more clearly from the following specification in conjunction with the accompanying greatly simplified, schematic drawing, in which.

SUMMARY OF THE INVENTION

Figure 1:
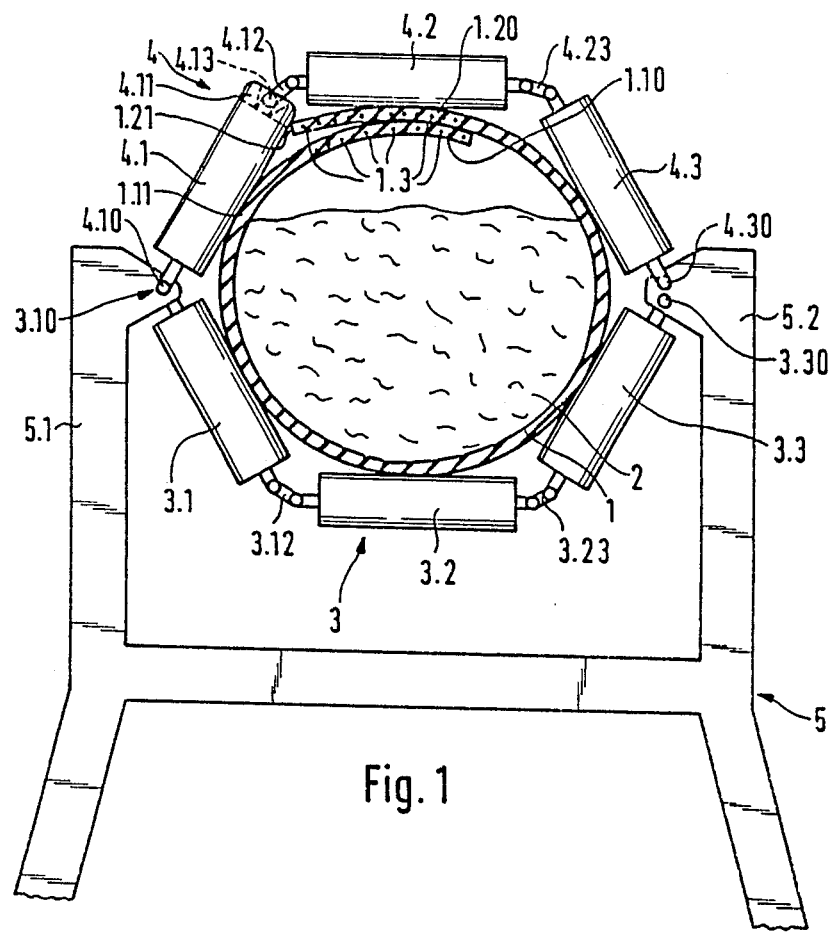
FIG. 1 is a cross-sectional view through one exemplary embodiment of the inventive hose belt conveyor system.

The hose belt conveyor system of the present invention is characterized primarily in that that first roller which rolls along the longitudinal edge of the overlapping one of the belt edge regions, and which rides on the belt side wall that is adjacent to the overlapped one of the belt edge regions, has an end that is directed toward the longitudinal edge of the overlapping belt edge region and is provided with an extension that extends the surface of this first roller, with this extension extending at least to that pivot joint of the first roller via which the latter is connected to the adjacent roller, which rides on the overlapping one of the belt edge regions.

As a result of the inventive axial extension of the surface of the indicated lateral support roller, the end of this roller is at a greater radial distance from the outer wall of the hose-like belt, so that when the belt twists about its longitudinal axis, the exposed edge of the belt ordinarily does not contact the end face of the roller, but rather it is slidingly pushed under the smooth-walled cylindrical surface of the roller, on which it rides. The extension of the roller surface advantageously extends far enough that is projects beyond the garland pivot joint via which this roller is pivotably connected to the adjacent roller; of course, it is to be understood that the extension does not extend so far that it adversely affects the efficient operation of this pivot joint.

Pursuant to a particularly advantageous embodiment of the present invention, the surface of the roller extension, rather than being continuously cylindrical, is tapered in the direction of its free end, either over the entire distance or in the end region only, and in particular preferably by at least 20%. This additionally improves the conditions under which the exposed belt edge can be pushed under the side roller in a smooth manner when the belt twists, in other words, the side roller can roll over the edge of the belt. In this connection, it is expedient to have the roller surface merge continuously from its cylindrical portion into the tapered portion, and to round off the end of the extension in such a way that it then extends at right angles to the axis of the roller. One inventive embodiment of this type is advantageously characterized in that the shape of the taper, when viewed in an axial longitudinal cross section of the roller, corresponds to a quarter of a circle, one side of which merges with the concentric surface of the cylindrical roller body, and the other side of which extends at right angles to the axis of the roller; the radius of this quarter circle is 20 to 50% of the radius of the cylindrical portion of the roller.

Pursuant to a practical embodiment of the present invention that is particularly advantageous with regard to manufacturing effort, the extension of the roller surface, rather than being integral with the remainder of the roller, is in the form of an annular member that is disposed on the end face of the cylindrical portion of the roller. This provides numerous opportunities for altering the contour of the roller extension as needed without undergoing great expense, and also for being able to conform to various conditions. In particular, this preferred embodiment of the invention provides the condition for being able to make the inventively extended side roller in an economical manner from a cylindrical roller that resembles the remaining garland rollers, and an extension in the form of an annular member that is disposed on this roller.

Further specific features of the present invention will be described in detail subsequently.

DESCRIPTION OF PREFERRED EMBODIMENTS

Referring now to the drawing in detail, as shown in FIG. 1, the conveyor belt 1, which is formed into a hose belt and confines the material 2 that is to be conveyed, is made in a known manner of, for example, a synthetic rubber. The lower half of the cross section of the belt 1 is supported by the rollers 3.1, 3.2, and 3.3 of a lower garland or partial ring of rollers 3, while the upper half of the cross section of the belt 1 is guided by the rollers 4.1, 4.2, and 4.3 of an upper garland or partial ring of rollers 4 in such a way that the belt edge regions 1.10 and 1.20 overlap one another. Embedded in the conveyor belt 1, especially in its overlapping edge regions 1.10 and 1.20, are strength or load-carriers 1.3, for example in the form of steel wires, that are continuous in the longitudinal direction. The central region of the belt can contain conventional reinforcing inserts that extend in the transverse and/or diagonal direction, and are not illustrated in the drawing. These reinforcing inserts serve as a protection against puncture, and increase the load-carrying capacity of the belt. The roller garlands 3 and 4 are pivotably or hingedly mounted to the arms 5.1 and 5.2 of the support frame 5 at the end points 3.10, 3.30 and 4.10, 4.30. The rollers, which are rotatable about their shafts, are pivotably or hingedly interconnected via connecting links 3.12, 3.23 and 4.12, 4.23.

Pursuant to the present invention, that roller 4.1 which rolls or rides on the side wall of the belt and is adjacent the exposed longitudinal belt edge 1.21, has an extension 4.11, the end of which is rounded off. The extension 4.11 preferably extends beyond the pivot joint 4.13. As can be seen in FIG. 1, which shows the hose-like belt 1 in a slightly twisted position, the exposed belt edge 1.21 can consequently no longer contact a sharp-edged end face of the roller 4.1. Instead, the belt edge 1.21 is guided below the roller 4.1 in a sliding manner by means of the rounded-off end of the roller extension 4.11, thus preventing the belt edge 1.21 from being subjected to any sharp edges.

Figure 2:
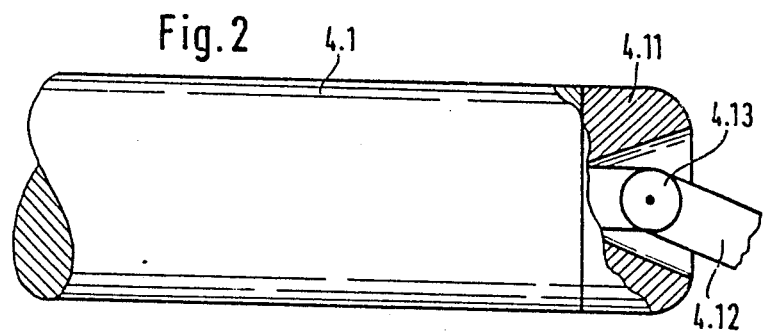
FIG. 2 is a partially broken-away side view of one exemplary embodiment of the inventively extended side roller of the system of FIG. 1.

The enlarged illustration of FIG. 2 clearly shows the present invention via a preferred exemplary embodiment of the side roller 4.1. Disposed on a cylindrical roller 4.1, which resembles the remaining rollers of the roller garlands, is an annular member 4.11, the free end of which is spherically rounded off. The annular member 4.11 extends over the garland pivot joint 4.13 and a portion of the connecting link 4.12 that is connected thereto.

The present invention is, of course, in no way restricted to the specific disclosure of the specification and drawing, but also encompasses any modifications within the scope of the appended claims.

What I claim is:

1. In a hose belt conveyor system having a conveyor belt that is made of rubber or rubber-like synthetic material, that contains filamentary load-carriers which extend in the longitudinal direction of the belt, and that can be closed, by overlapping its longitudinal edge regions, each of which has a longitudinal edge, to form a hose belt, the side walls of which are supported all the way around by support rollers that are divided into garlands of rollers; in particular, in a given stretch of the conveyor system that has been closed in the manner of a hose, a first garland of rollers is provided that substantially surrounds the lower half of the cross section of said hose belt, and a second garland of rollers is provided that substantially surrounds the upper half of the cross section of said hose belt, with adjacent rollers of a given roller garland being interconnected, said rollers having pivot joints, with connecting links being connected to said pivot joints to effect said interconnection; the improvement wherein:

that first roller which rolls along said longitudinal edge of the overlapping one of said belt edge regions, and which rides on the belt side wall that is adjacent to the overlapped one of said belt edge regions, has an end that is directed toward said longitudinal edge of said overlapping belt edge region and that is provided with an extension that extends the surface of said first roller, with said extension extending at least to that pivot joint of said first roller via which the latter is connected to the adjacent roller, which rides on the overlapping one of said belt edge regions.

2. A hose belt conveyor system according to claim 1, in which said extension extends beyond said described pivot joint of said first roller.

3. A hose belt conveyor system according to claim 1, in which said extension has a free end, remote from the remainder of said first roller, with said extension tapering uniformly in the direction toward said free end thereof.

4. A hose belt conveyor system according to claim 3, in which the entire distance of said extension is tapered.

5. A hose belt conveyor system according to claim 3, in which that portion of said extension remote from said first roller is tapered.

6. A hose belt conveyor system according to claim 3, in which said tapering is a radial tapering amounting to at least 20% of the radius of said first roller, which is cylindrical.

7. A hose belt conveyor system according to claim 6, in which the surface of said first roller and of said extension merge uniformly from a cylindrical zone into the tapering zone, with the surface of said free end of said extension extending at right angles to the central axis of said first roller.

8. A hose belt conveyor system according to claim 7, in which said tapering zone of said extension, when viewed in an axial cross section of said first roller, has the shape of a quarter circle, one end of which merges with the concentric cylindrical surface of said first roller, and the other end of which extends at right angles to the central axis of said first roller, with the radius of said quarter circle being 20 to 50% of the radius of said cylindrical surface of said first roller.

9. A hose belt conveyor system according to claim 1, in which said extension is in the form of an annular member that is disposed on that end of a cylindrical first roller that is directed toward said longitudinal edge of said overlapping one of said belt edge regions.

10. A hose belt conveyor system according to claim 9, in which said first roller comprises a cylindrical roller that resembles the remaining rollers of said garland rollers, and an extension in the form of an annular member that is disposed on said first roller.

* * * * *